United States Patent
Ehlers

(10) Patent No.: US 9,358,437 B2
(45) Date of Patent: Jun. 7, 2016

(54) METHOD OF MANUFACTURING A COMPOSITE SHAFT

(71) Applicant: CALLAWAY GOLF COMPANY, Carlsbad, CA (US)

(72) Inventor: Steven M. Ehlers, Poway, CA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

(21) Appl. No.: 14/682,423

(22) Filed: Apr. 9, 2015

(65) Prior Publication Data

US 2015/0209631 A1 Jul. 30, 2015

Related U.S. Application Data

(62) Division of application No. 13/828,233, filed on Mar. 14, 2013, now Pat. No. 9,017,507.

(51) Int. Cl.

| | |
|---|---|
| *A63B 53/10* | (2015.01) |
| *B29C 70/30* | (2006.01) |
| *A63B 53/00* | (2015.01) |
| *B29K 105/10* | (2006.01) |
| *B29C 35/02* | (2006.01) |
| *B29C 70/02* | (2006.01) |
| *B29C 71/02* | (2006.01) |
| *B29C 55/04* | (2006.01) |
| *A63B 53/14* | (2015.01) |
| *B29L 31/52* | (2006.01) |

(52) U.S. Cl.
CPC .............. *A63B 53/10* (2013.01); *B29C 70/30* (2013.01); *A63B 53/007* (2013.01); *A63B 53/14* (2013.01); *A63B 2209/02* (2013.01); *B29C 35/02* (2013.01); *B29C 55/04* (2013.01); *B29C 70/021* (2013.01); *B29C 71/02* (2013.01); *B29K 2105/101* (2013.01); *B29L 2031/5227* (2013.01); *Y10T 156/1002* (2015.01); *Y10T 156/1062* (2015.01)

(58) Field of Classification Search
CPC ...... A63B 53/10; A63B 53/007; A63B 53/14; A63B 2209/02; B29K 2105/101; B29C 35/02; B29C 70/021; B29C 71/02; B29C 55/04; B29C 70/30; Y10T 156/1062; Y10T 156/1002; B29L 2031/5227
See application file for complete search history.

(56) References Cited

U.S. PATENT DOCUMENTS

| | | | | |
|---|---|---|---|---|
| 3,998,458 | A * | 12/1976 | Inoue .................... | A63B 53/10 273/DIG. 23 |
| 4,350,732 | A * | 9/1982 | Goodwin ............... | A43B 23/16 442/244 |
| 5,049,422 | A * | 9/1991 | Honma .................. | A63B 53/10 428/113 |
| 5,143,374 | A * | 9/1992 | Shibasaki ............. | A63B 53/10 273/DIG. 7 |
| 5,178,706 | A * | 1/1993 | Nishibara ............. | B29C 55/023 156/163 |
| 5,626,529 | A * | 5/1997 | Roy ....................... | A63B 53/10 156/188 |
| 6,666,778 | B2 * | 12/2003 | Ashida ................... | A63B 53/10 473/319 |
| 8,915,796 | B2 * | 12/2014 | Yashiki .................. | A63B 53/10 473/319 |
| 2002/0028332 | A1 * | 3/2002 | Pratt ...................... | A01K 87/00 428/364 |

FOREIGN PATENT DOCUMENTS

| | | | |
|---|---|---|---|
| JP | 11-206935 | * | 8/1999 |
| JP | 11206935 A | * | 8/1999 |
| JP | 2004-66831 | * | 3/2004 |
| JP | 2004066831 A | * | 3/2004 |

* cited by examiner

*Primary Examiner* — Stephen Blau
(74) *Attorney, Agent, or Firm* — Rebecca Hanovice; Michael Catania; Sonia Lari

(57) ABSTRACT

A composite shaft formed from a single flag of composite material having variable fiber orientation, and methods of forming said shaft, are disclosed herein.

18 Claims, 6 Drawing Sheets

METHOD OF MANUFACTURING A COMPOSITE SHAFT

CROSS REFERENCES TO RELATED APPLICATIONS

The present application claims priority to, and is a division of, U.S. patent application Ser. No. 13/828,233, filed on Mar. 14, 2013, and issued as U.S. Pat. No. 9,017,507, on Apr. 28, 2015.

STATEMENT REGARDING FEDERALLY SPONSORED RESEARCH OR DEVELOPMENT

Not Applicable

BACKGROUND OF THE INVENTION

1. Field of the Invention

The present invention relates to composite shafts constructed from variable angle plies, or flags, such that the fiber orientation varies along the length of the shafts.

2. Description of the Related Art

Shafts made from non-metal materials, such as graphite composite, are routinely used with sporting equipment such as golf clubs. Composite shafts typically are constructed from multiple plies, or flags, of composite that are rolled onto a tapered mandrel in a process known as sheet wrapping. Each flag has a fixed fiber orientation relative to the longitudinal axis. In general, the fiber orientations used are 0°, which means the fibers run parallel to the shaft axis, ±45°, and 90°, which means that the fibers extend in a circumferential direction around the shaft.

A flag extends over a finite length along a shaft axis from a start position to an end position and is sized for a defined number of wraps about the shaft axis. As shown in FIG. 2, most flags are roughly trapezoidal in shape. A unidirectional composite material typically is comprised of fibers oriented along a given direction with resin matrix filler in a thin layer, which forms a configuration known as a prepreg. A prepreg also typically has a backing material to maintain integrity of the ply during handling.

For sheet wrapped construction, changing ply orientation along the length of the shaft requires that separate flags, oriented at different angles, be placed along the shaft axis. The flags are made to overlap in this construction to ensure structural continuity and strength. This overlapping configuration is detrimental, however, because it increases the complexity of the sheet wrapping process, adds weight, and creates an uneven thickness distribution in the wall of the shaft.

In view of the above, there is a need for thin, lightweight, composite shafts that are capable of resisting the stresses and strains placed upon them during use, particularly when they are used with golf club equipment.

BRIEF SUMMARY OF THE INVENTION

The present invention is directed to the use of composite flags having varying fiber orientation along their length to construct shafts with low weight and high structural integrity. One aspect of the present invention is a shaft comprising 0° fiber orientation at its tip end, where high bending stiffness is needed, and 30° orientation at its butt end, wherein more circumferential strength is required.

Another aspect of the present invention is a composite shaft comprising a shaft axis, a butt end, and a tip end, wherein the composite shaft is composed of a single composite flag, and wherein the fiber orientation of the flag with respect to the shaft axis varies along the shaft axis. In some embodiments, the fiber orientation of the flag at the tip end may be no less than 0° and no more than 15°, and further may be approximately 0°. In other embodiments, the fiber orientation of the flag at the butt end may be no less than 20° and no more than 45°, and further may be approximately 30°. In some embodiments, the flag may be approximately trapezoidal in shape. In further embodiments, the composite shaft may comprise a golf club head and a grip, wherein the golf club head may be affixed to the tip end and the grip may be affixed to the butt end. In another embodiment, the composite flag may comprise a backing material, which may be composed of an open weave material.

Yet another aspect of the present invention is a method of manufacturing a composite shaft, the method comprising the steps of preparing a sheet of prepreg material, dividing the prepreg material into a plurality of segments, deforming each of the plurality of segments by a designated offset to create a deformed prepreg sheet, cutting a single flag from the deformed prepreg sheet, and constructing a shaft from the single flag. In some embodiments, the step of deforming each of the plurality of segments by a designated offset may be accomplished with a table comprising a plurality of parallel bars, wherein each of the parallel bars may be free to move laterally while at the same time staying in contact with each other. In some further embodiments, each bar may grasp the prepreg material, and the individual offset for each bar may be enforced in small increments until the desired offset profile is reached. In further embodiments, each bar may grasp the prepreg material with a device selected from the group consisting of a strap, a clamping bar, and an adhesive.

In some embodiments, the shaft may comprise a longitudinal shaft axis, a tip end, and a butt end, the tip end may comprise fibers oriented at no less than 0° and no more than 15° with respect to the shaft axis, and the butt end may comprise fibers oriented at no less than 20° and no more than 45° with respect to the shaft axis. In a further embodiment, the tip end may comprise fibers oriented at approximately 0° with respect to the shaft axis, and the butt end may comprise fibers oriented at approximately 30° with respect to the shaft axis. In some embodiments, the prepreg material may comprise a backing material, which may comprise an open weave construction. In some embodiments, the method may further comprise the step of slitting the backing material perpendicular to the undeformed fiber, and this further step may occur prior to the step of deforming each of the plurality of segments.

Another aspect of the present invention is a method of manufacturing a composite shaft, the method comprising the steps of preparing a sheet of prepreg material, the prepreg material comprising a plurality of fibers, a resin material, and a backing material, dividing the prepreg material into a plurality of segments, deforming each of the plurality of segments by a designated offset to create a deformed prepreg sheet using a table comprising a plurality of parallel bars, wherein each of the parallel bars is free to move laterally, and wherein the plurality of parallel bars stay in contact with one another, cutting a single flag from the deformed prepreg sheet, and constructing a shaft from the single flag, wherein the shaft comprises a longitudinal shaft axis, a tip end, and a butt end, wherein the tip end comprises fibers oriented at no less than 0° and no more than 15° with respect to the shaft axis, and wherein the butt end comprises fibers oriented at no less than 20° and no more than 45° with respect to the shaft axis.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
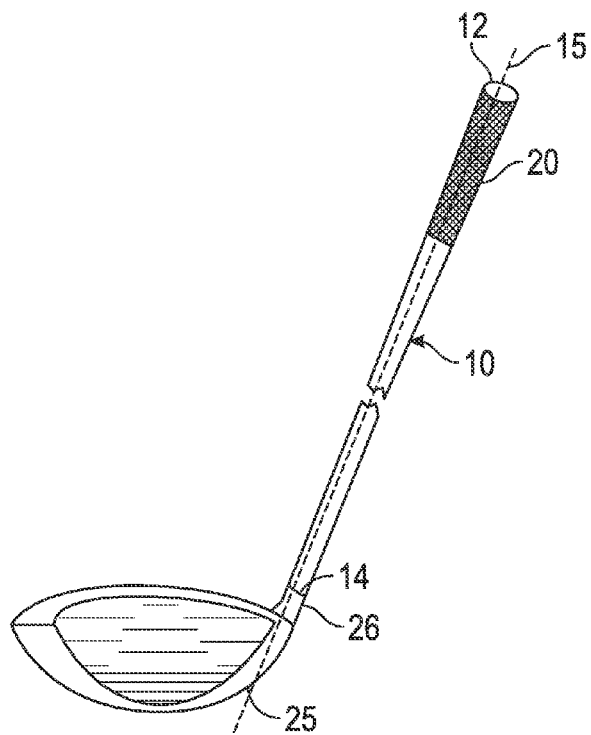
FIG. 1 is a front, perspective view of a golf club including an embodiment of the present invention.

As shown in FIG. 1, a shaft 10 used with a golf club typically includes a shaft axis 15, a butt end 12 to which a grip 20 is affixed, and a tip end 14, at least part of which is inserted into, and in many cases permanently bonded to, the hose 26 of a golf club head 25 or a shaft sleeve (not shown) for use with an adjustable golf club head 25. Shafts 10 used with golf club heads 25 typically have a length of 35 to 46 inches, though they may be as short as 18 inches or as long as 48 inches, as desired by the player. Composite shafts 10 are desirable for use with golf club heads 25 because they are strong and lightweight, and free up mass that can be used to incorporate advanced golf club head 25 technology.

Figure 2:
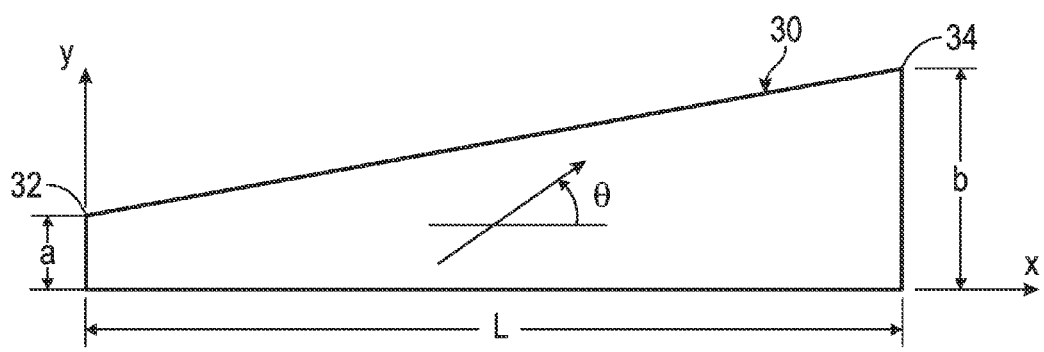
FIG. 2 is a front, plan view of a typical composite ply layout.

The present invention is directed to composite shafts 10 having variable composite fiber orientation along their lengths, a configuration that is particularly useful for golf equipment. Composite shafts 10 typically are constructed from multiple plies, or flags 30, of composite that are rolled onto a tapered mandrel in a process known as sheet wrapping. Each flag 30, an example of which is shown in FIG. 2, has a fixed fiber orientation relative to the longitudinal axis of the resulting shaft 10. The flag 30 has a length, L, a wrap direction dimension a at its tip end 32, a wrap dimension b at its butt end 34, and a fiber angle θ, which is relative to the longitudinal axis x of the flag 30.

Figure 3:
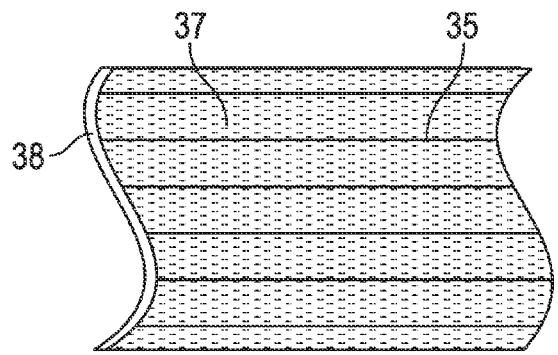
FIG. 3 is a front, plan view of an idealized section of composite material.

In general, the fiber orientations used in a typical flag 30 are 0°, which means the fibers run parallel to the shaft axis, ±45°, and 90°, which means that the fibers extend in a circumferential direction around the shaft 10. A flag 30 extends over a finite length along the shaft axis 15 from a start position to an end position and is sized for a defined number of wraps about the shaft axis 15. As shown in FIG. 2, most flags 30 are roughly trapezoidal in shape. A unidirectional composite material typically is comprised of fibers 35 oriented along a given direction with resin matrix filler 37 in a thin layer, which forms a configuration known as a prepreg, an idealized section of which is shown in FIG. 3. As shown in FIG. 3, prepreg also typically includes a backing material 38 that is designed to maintain integrity of the prepreg material during handling.

Figure 4A:
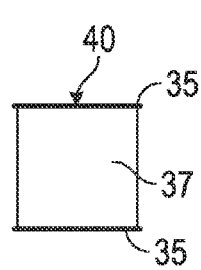
FIG. 4A is a front plan view of a composite segment in an undeformed condition.
Figure 4B:
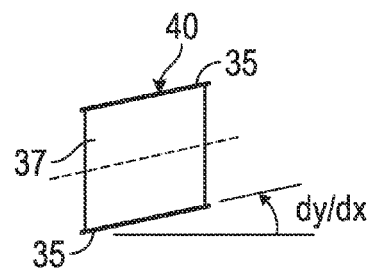
FIG. 4B is a front plan view of a composite segment in a pure shear deformation.
Figure 4C:
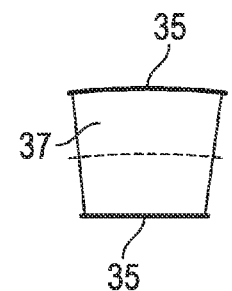
FIG. 4C is a front plan view of a composite segment in a combined extension and bending deformation.

In situations where minimum weight and structural integrity are important, such as with golf equipment, variable fiber orientation is beneficial. Unfortunately, as illustrated in FIGS. 4A-4C, obtaining variable fiber orientation can be difficult. As shown in FIG. 4A, a segment 40 of composite material, which makes up a flag 30, has single fibers 35 along its upper and lower surfaces that contain the resin matrix material 37. When in pure shear, as shown in FIG. 4B, the fibers 35 rotate and are aligned with the local slope, dy/dx, but are not subjected to extensional strain because no change in length takes place. Instead, the resin matrix material 37 deforms in shear only and experiences no change in volume. This form of deformation requires very little force because the fibers 35 do not deform and there is no volume change to the resin matrix material 37.

In order to facilitate this deformation process, the backing material 38 typically used for handling composite prepreg can be slit perpendicular to the undeformed fiber 35 direction to allow shear deformation of the flag 30 to take place. Alternatively, another form of shear flexible material, such as an open weave, can be used as backing material 38. If the composite segment 40 is deformed in general bending and extension, which would occur if overall curvature of a composite flag 30 in the xy-plane were enforced, the segment 40 behaves as shown in FIG. 4C. In this case, the fibers 35 are subjected to extensional strains and the resin matrix material 37 undergoes a change in volume. Deforming a composite material in this manner is difficult because the fibers 35 are stiff and resist longitudinal deformation. Additionally, changing the volume of the resin matrix material 37 tends to cause the resin to flow.

Figure 5:
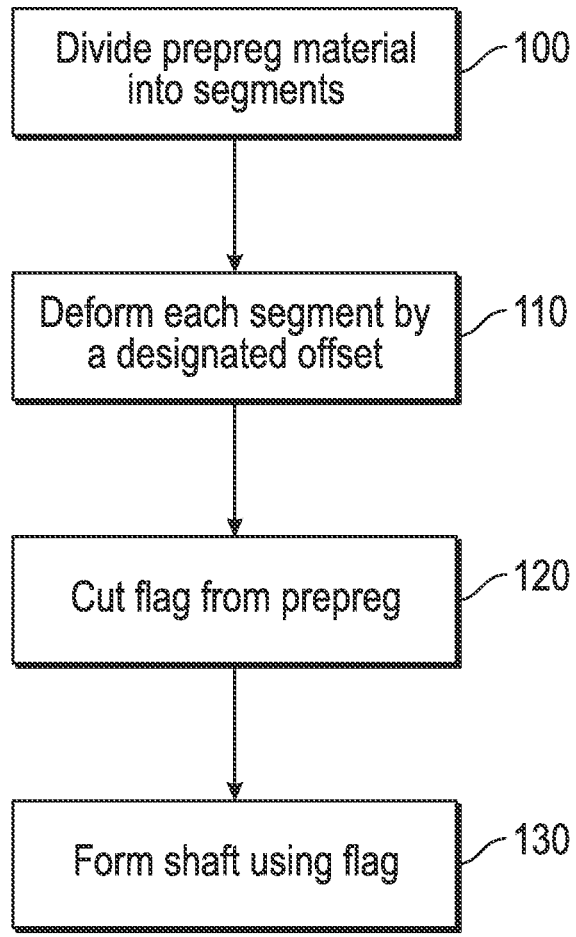
FIG. 5 is a flow chart showing a method of the present invention.
Figure 6A:
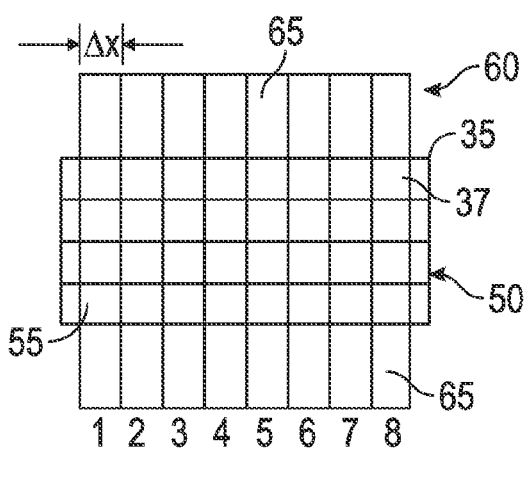
FIGS. 6A-6C are front plan views of prepreg sheets on an adjustment table having different lateral deformations.
Figure 6B:
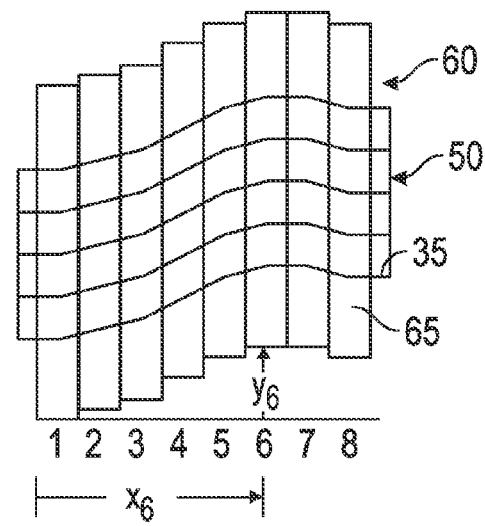
Figure 6C:
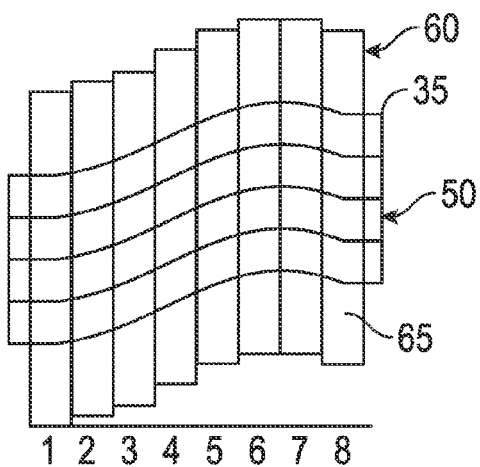

According to a preferred method of the present invention, shown in flow chart form in FIG. 5, composite material is transformed into a variable angle flag 30 by gradually deforming the material in transverse shear along its longitudinal axis x according to processes illustrated in FIGS. 6A-6C. As shown in FIG. 6A, a sheet of prepreg material 50 first is divided into segments 55 along its longitudinal axis x 100. Each segment 55 corresponds to a longitudinal position, $x_i$, along the prepreg material 50. Each of the segments 55 is then deformed by a designated offset, $y_i$ 110, which orients the fibers 35 of the prepreg material 50 at desired angles along the longitudinal axis as shown in FIG. 6B. As shown in FIGS. 6A-6C, the deformation step is accomplished using a table 60 with multiple parallel bars 65 that are free to move laterally while at the same time staying in contact with each other. In this embodiment, the prepreg material 50 is held at each bar 65 by a strap, clamping bar, or adhesive, and the individual offset for each bar 65 is enforced in small increments until the desired offset profile is reached. Because the fibers 35 of the prepreg material 50 are continuous and have some flexural stiffness, they do not deform in a piecewise linear manner, and their resulting shape is a smooth curve as shown in FIG. 6C.

Figure 7A:
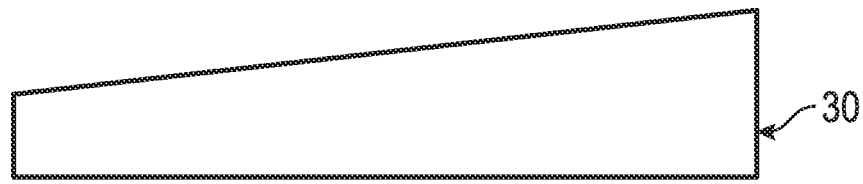
FIG. 7A-7C are front, plan views of a trapezoidal flag cut from a deformed section of prepreg material.
Figure 7B:
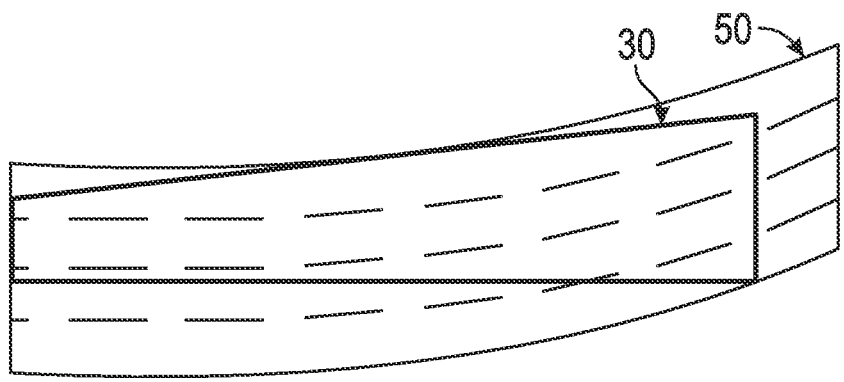
Figure 7C:
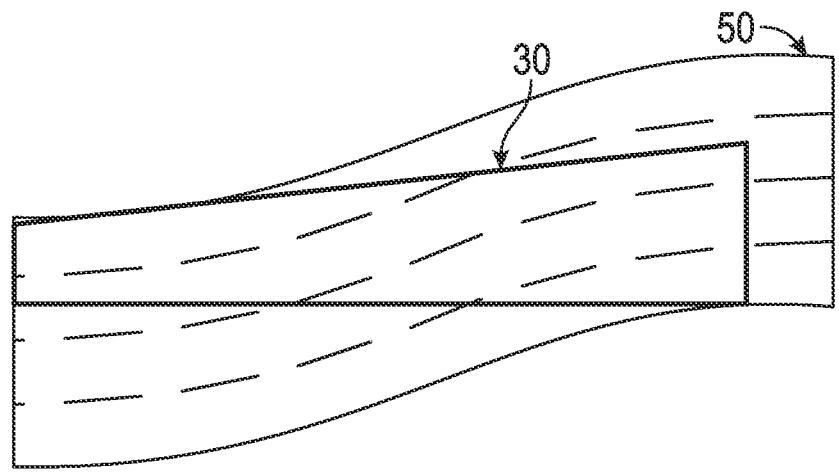

Once a piece of prepreg material 50 is deformed as shown in FIGS. 6A-6C, a trapezoidal flag 30 that will be used to create the shaft 10 is cut 120 from a section of the prepreg material 50 according to the process shown in FIGS. 7A-7C. Table 1 provides an example of the parameters for a twenty five-inch long flag 30 that has been divided into twenty five equal width segments 55. Once the flag 30 is cut, a shaft 10 is formed 130 by a process such as sheet wrapping or another process known to a person skilled in the art.

TABLE 1

| Position (in.) | Delta (in.) | Offset (in.) | Slope | Angle (deg) |
|---|---|---|---|---|
| 0.0 | 0.000 | 0.000 | 0.000 | 0.0 |
| 0.5 | 0.000 | 0.000 | 0.000 | 0.0 |
| 1.0 | 0.000 | 0.000 | 0.000 | 0.0 |
| 1.5 | 0.000 | 0.000 | 0.000 | 0.0 |
| 2.0 | 0.000 | 0.000 | 0.000 | 0.0 |
| 2.5 | 0.000 | 0.000 | 0.000 | 0.0 |
| 3.0 | 0.000 | 0.000 | 0.010 | 0.6 |
| 3.5 | 0.010 | 0.010 | 0.030 | 1.7 |
| 4.0 | 0.020 | 0.030 | 0.050 | 2.9 |
| 4.5 | 0.030 | 0.060 | 0.070 | 4.0 |
| 5.0 | 0.040 | 0.100 | 0.090 | 5.1 |
| 5.5 | 0.050 | 0.150 | 0.110 | 6.3 |
| 6.0 | 0.060 | 0.210 | 0.130 | 7.4 |
| 6.5 | 0.070 | 0.280 | 0.150 | 8.5 |
| 7.0 | 0.080 | 0.360 | 0.170 | 9.6 |
| 7.5 | 0.090 | 0.450 | 0.190 | 10.8 |
| 8.0 | 0.100 | 0.550 | 0.210 | 11.9 |
| 8.5 | 0.110 | 0.660 | 0.230 | 13.0 |
| 9.0 | 0.120 | 0.780 | 0.250 | 14.0 |
| 9.5 | 0.130 | 0.910 | 0.270 | 15.1 |
| 10.0 | 0.140 | 1.050 | 0.290 | 16.2 |
| 10.5 | 0.150 | 1.200 | 0.310 | 17.2 |
| 11.0 | 0.160 | 1.360 | 0.330 | 18.3 |
| 11.5 | 0.170 | 1.530 | 0.350 | 19.3 |
| 12.0 | 0.180 | 1.710 | 0.365 | 20.1 |
| 12.5 | 0.185 | 1.895 | 0.375 | 20.6 |
| 13.0 | 0.190 | 2.085 | 0.385 | 21.1 |
| 13.5 | 0.195 | 2.280 | 0.395 | 21.6 |
| 14.0 | 0.200 | 2.480 | 0.400 | 21.8 |
| 14.5 | 0.200 | 2.680 | 0.400 | 21.8 |
| 15.0 | 0.200 | 2.880 | 0.400 | 21.8 |
| 15.5 | 0.200 | 3.080 | 0.400 | 21.8 |
| 16.0 | 0.200 | 3.280 | 0.400 | 21.8 |
| 16.5 | 0.200 | 3.480 | 0.400 | 21.8 |
| 17.0 | 0.200 | 3.680 | 0.400 | 21.8 |
| 17.5 | 0.200 | 3.880 | 0.400 | 21.8 |
| 18.0 | 0.200 | 4.080 | 0.400 | 21.8 |
| 18.5 | 0.200 | 4.280 | 0.400 | 21.8 |
| 19.0 | 0.200 | 4.480 | 0.400 | 21.8 |
| 19.5 | 0.200 | 4.680 | 0.400 | 21.8 |
| 20.0 | 0.200 | 4.880 | 0.400 | 21.8 |
| 20.5 | 0.200 | 5.080 | 0.400 | 21.8 |
| 21.0 | 0.200 | 5.280 | 0.400 | 21.8 |
| 21.5 | 0.200 | 5.480 | 0.400 | 21.8 |
| 22.0 | 0.200 | 5.680 | 0.400 | 21.8 |
| 22.5 | 0.200 | 5.880 | 0.400 | 21.8 |
| 23.0 | 0.200 | 6.080 | 0.400 | 21.8 |
| 23.5 | 0.200 | 6.280 | 0.400 | 21.8 |
| 24.0 | 0.200 | 6.480 | 0.400 | 21.8 |
| 24.5 | 0.200 | 6.680 | 0.400 | 21.8 |

Figure 8:
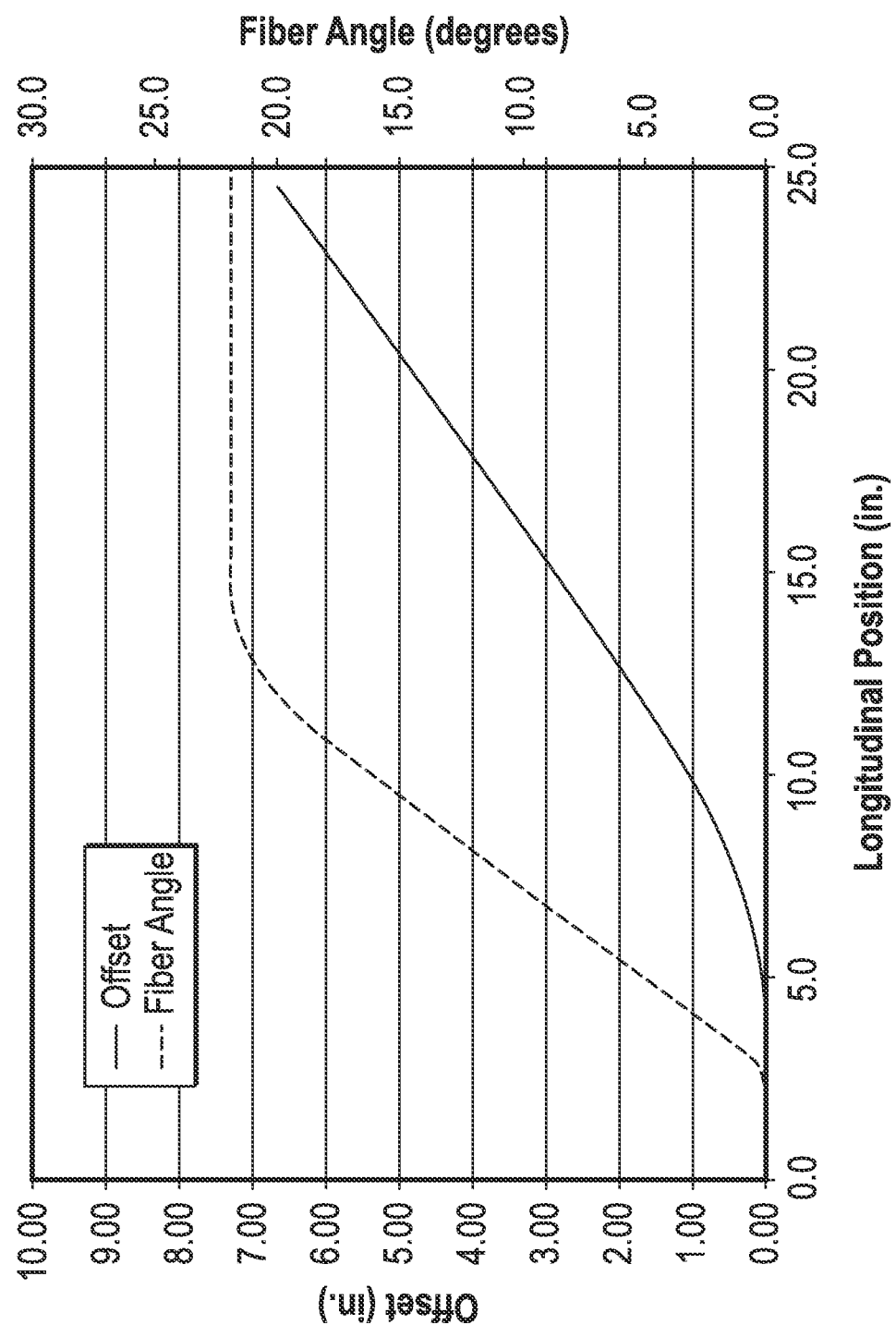
FIG. 8 is a chart showing the offset distance versus position in a variable fiber angle composite of the present invention.

FIG. 8 shows the offset profile and fiber angle profile resulting from the method disclosed herein and illustrated in FIGS. 6A-6C and Table 1. In this example, the tip portion of the flag 30 has a fiber orientation of 0°. The fiber angle increases almost linearly in the middle portion to 22° and remains constant at that value for the remainder of the flag.

Shear deformation of the prepreg material 50 is a key feature of the method of the present invention because it requires minimal force and keeps the fiber 35 and resin matrix material 37 of the prepreg material 50 intact. This method is most readily applicable to composite prepreg material 50 used in standard hand lay-up and sheet wrap processes. However, the backing material 38 on the prepreg material 50 must be modified to permit shear deformation transverse to the longitudinal axis of the ply. This method may also be adapted to automated tape laying (ATL). In ATL, the tape laying head translates laterally perpendicular to the tape laying path without rotation of the head to produce the desired slope.

The method disclosed herein provides a number of benefits for shaft 10 performance. First, the composite fiber remains continuous along the length of the flag 30, which provides increased strength and stiffness through the elimination of cut fibers, overlap joints, and thickness discontinuities. Furthermore, shaft 10 weight is reduced through the elimination of flag 30 overlap regions and fabrication is simplified, with one flag 30 replacing multiple flags 30 of different fiber angles.

In one embodiment of the present invention, the method disclosed herein is used to form a shaft 10 a single composite flag having variable fiber orientation, an example of which is shown in FIGS. 2 and 6A-6C, so that the tip end 14 of the shaft 10, which requires high bending stiffness, has composite fibers with 0° orientation, and the butt end 12, which requires more circumferential strength, has composite fibers with 30° orientation.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

I claim as my invention the following:

1. A composite shaft comprising a shaft axis,
   wherein the composite shaft is composed of a single composite flag comprising a butt end and a tip end,
   wherein the composite flag comprises a plurality of carbon fibers,
   wherein the fiber orientation of the flag with respect to the shaft axis varies along at least a portion of the shaft axis,
   wherein the fiber orientation of the flag with respect to the shaft axis increases from the tip portion of the flag to an approximate midpoint of the flag, wherein the fiber orientation of the flag remains constant from the midpoint to the butt end of the flag, and
   wherein the composite flag is cut from a sheet of pre-deformed prepreg material.

2. The composite shaft of claim 1, wherein the fiber orientation of the flag at the tip end is no less than 0° and no more than 15°.

3. The composite shaft of claim 2, wherein the fiber orientation of the flag at the tip end is approximately 0°.

4. The composite shaft of claim 1, wherein the fiber orientation of the flag at the butt end is no less than 20° and no more than 45°.

5. The composite shaft of claim 4, wherein the fiber orientation of the flag at the butt end is approximately 30°.

6. The composite shaft of claim 1, wherein the flag is approximately trapezoidal in shape.

7. The composite shaft of claim 1, further comprising a golf club head and a grip, wherein the golf club head is affixed to a tip end of the composite shaft, and wherein the grip is affixed to a butt end of the composite shaft.

8. The composite shaft of claim 1, wherein the composite flag comprises a backing material.

9. The composite shaft of claim 8, wherein the backing material is composed of an open weave material.

10. The composite shaft of claim 1, wherein the shaft has a length of at least 35 inches and no more than 46 inches.

11. The composite shaft of claim 1, wherein the shaft has a length of approximately 18 inches.

12. The composite shaft of claim 1, wherein the shaft has a length of approximately 48 inches.

13. The composite shaft of claim 1, wherein the fiber orientation of the flag at the tip portion is approximately 0°, and wherein the fiber orientation of the flag at the midpoint is approximately 22°.

14. A composite shaft comprising a shaft axis,
wherein the composite shaft is composed of a single composite flag comprising a butt end and a tip end,
wherein the composite flag comprises a plurality of continuous carbon fibers,
wherein the composite flag is trapezoidal in shape,
wherein the fiber orientation of the flag with respect to the shaft axis varies along at least a portion of the composite shaft,
wherein the fiber orientation increases from a tip portion to an approximate midpoint of the flag, and
wherein the fiber orientation remains constant from the midpoint to the butt end of the flag.

15. The composite shaft of claim 14, wherein the fiber orientation of the tip end is approximately 0°, and wherein the fiber orientation of the midpoint is approximately 22°.

16. The composite shaft of claim 14, wherein the fiber orientation of the tip end is no less than 0° and no more than 15°, and wherein the fiber orientation of the butt end is no less than 20° and no more than 45°.

17. The composite shaft of claim 14, wherein each of the composite fibers has a smoothly curved shape.

18. The composite shaft of claim 14, further comprising a backing material composed of an open weave material.

* * * * *